United States Patent
Ogata et al.

(10) Patent No.: US 8,176,213 B2
(45) Date of Patent: May 8, 2012

(54) PROCESSING RESPONDING DEVICE, PROCESSING REQUESTING DEVICE AND THEIR METHODS

(75) Inventors: Hideaki Ogata, Yokohama (JP); Noriyuki Nagai, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 357 days.

(21) Appl. No.: 12/020,160

(22) Filed: Jan. 25, 2008

(65) Prior Publication Data
US 2008/0195767 A1  Aug. 14, 2008

(30) Foreign Application Priority Data
Jan. 25, 2007  (JP) ................................. 2007-015489

(51) Int. Cl.
*G06F 3/00* (2006.01)
*G06F 13/42* (2006.01)
(52) U.S. Cl. ............. 710/11; 710/30; 710/105; 709/227; 709/229; 713/163
(58) Field of Classification Search .................... None
See application file for complete search history.

(56) References Cited

U.S. PATENT DOCUMENTS

| | | | | |
|---|---|---|---|---|
| 4,763,066 | A * | 8/1988 | Yeung et al. | 324/73.1 |
| 6,009,479 | A * | 12/1999 | Jeffries | 710/8 |
| 6,333,931 | B1 * | 12/2001 | LaPier et al. | 370/385 |
| 6,374,288 | B1 * | 4/2002 | Bhagavath et al. | 709/203 |
| 6,735,650 | B1 * | 5/2004 | Rothberg | 710/74 |
| 2001/0028654 | A1 * | 10/2001 | Anjum et al. | 370/401 |
| 2002/0065908 | A1 * | 5/2002 | Agerholm et al. | 709/223 |
| 2002/0188759 | A1 * | 12/2002 | Roy et al. | 709/245 |
| 2004/0030793 | A1 | 2/2004 | Noda et al. | |
| 2005/0223269 | A1 * | 10/2005 | Stolowitz | 714/6 |
| 2006/0056445 | A1 * | 3/2006 | Lin | 370/465 |

FOREIGN PATENT DOCUMENTS

| | | |
|---|---|---|
| JP | 2000285053 A | 10/2000 |
| JP | 2003-008583 A | 1/2003 |
| JP | 2006202195 A | 8/2006 |

OTHER PUBLICATIONS

Office Action dated Jan. 11, 2011, for Japanese Patent Application No. 2008-329510 and its English translation.

* cited by examiner

*Primary Examiner* — Eron J Sorrell
*Assistant Examiner* — Dean Phan
(74) *Attorney, Agent, or Firm* — Sughrue Mion, PLLC

(57) ABSTRACT

A user PC 20 prepares a retrieve request by storing a SNMP command and a predetermined processing execution condition into a retrieve request of a SLP and transmits and outputs the prepared retrieve request to a printer 40 and others by multicast. Receiving the retrieve request, the printer 40 obtains and executes the SNMP command stored in the retrieve request of the SLP and processes a response to the retrieve request when the execution result meets the processing execution condition. Thus, the SNMP command is executed by receiving the retrieve request of the SLP and the response to the retrieve request of the SLP is processed corresponding to the execution result, it is not necessary to separately transmit or to obtain the request process of the SLP and the retrieve request of the SNMP through the network and the execution result of the SNMP command may be reflected to the process of the SLP.

8 Claims, 6 Drawing Sheets

FIG.4

(SERVICE RETRIEVE REQUEST DURING NORMAL TIME)

| | |
|---|---|
| length of PRList | 0 |
| ⟨PRList⟩ String | |
| length of URL | 26 |
| URL | service:p-dev.1248:printer |
| length of ⟨scope-list⟩ | 0 |
| ⟨scope-list⟩ String | |
| length of ⟨tag-list⟩ | 17 |
| ⟨tag-list⟩ string | x-1248-p-dev:1:pn |

FIG.5

(SERVICE RETRIEVE REQUEST CONTAINING SNMP COMMAND)

| | |
|---|---|
| length of PRList | 0 |
| <PRList> String | |
| length of URL | 26 |
| URL | service:p-dev.1248:printer |
| length of <scope-list> | 0 |
| <scope-list> String | |
| length of <tag-list> | 64 |
| <tag-list> string | {x-1248-p-spt:snmpget v1 public 1.3.6.1.2.1.1.5.0 \| result:noError} |

PROCESSING RESPONDING DEVICE, PROCESSING REQUESTING DEVICE AND THEIR METHODS

BACKGROUND OF THE INVENTION

1. Field of the Invention

The present invention relates to a processing responding device, a processing requesting device and their methods.

2. Description of the Related Art

Hitherto, as a processing requesting device, there has been proposed one that obtains various information, that had been obtained through a plural times of communications, by creating an information obtaining request containing a plurality of requests such as a request for obtaining a device name, a request for obtaining a device ID, a request for obtaining detailed information corresponding to a type of the device and others by using a service location protocol (SLP) and by transmitting it to an object to be retrieved as disclosed in Japanese Patent Application Laid-Open No. 2006-202195.

SUMMARY OF THE INVENTION

By the way, there is a case when it is desirable to execute a plurality of protocols to obtain information of devices connected to a network in retrieving the devices for example. In such a case, the devices connected to the network have been retrieved by using a certain protocol and after narrowing down the devices on the basis of the retrieval result, information on the devices connected to the network has been obtained further by using another protocol. It has been thus necessary to transmit each execute request in utilizing the plurality of protocols and there has been a case when a heavy burden is posed on the network in obtaining the information of the devices by the plurality of protocols. Furthermore, it has been unable to efficiently conduct those processes because the result of one protocol cannot be automatically reflected to the result of the other protocol.

The present invention has been made in view of the problems described above and its object is to provide a processing responding device, a processing requesting device and their methods capable of efficiently conducting those processes and of reducing the load of the network.

In order to achieve the abovementioned object, the invention adopts the following means.

According to a first aspect of the invention, a processing responding device that responds to a processing requesting device through a network includes a first obtaining unit capable of obtaining information; a first protocol processing unit for obtaining a command of a second protocol when the command of the second protocol is stored in a processing request of a first protocol obtained by the first obtaining unit from the processing requesting device; and a second protocol processing unit that interprets the obtained command of the second protocol, executes and passes a result of the execution to the first protocol processing unit. In the processing responding device, the first protocol processing unit processes a response to the processing request on the basis of the execution result of the second protocol processing unit.

When the command of the second protocol is stored in the processing request of the first protocol obtained from the processing requesting device, the processing responding device obtains this command of the second protocol, interprets and executes the command of the obtained second protocol and processes the response to the processing request of the first protocol on the basis of the execution result. Thus, the processing responding device executes the command of the second protocol by receiving the processing request of the first protocol and processes the response to the processing request of the first protocol corresponding to the execution result, so that it is not necessary to obtain the request process of the first protocol and the processing request of the second protocol separately through the network and it is possible to reflect the execution result of the command of the second protocol to the process of the first protocol. Accordingly, it is possible to efficiently process the requests and to reduce the burden of the network more.

The processing responding device of the invention may further include a first output unit capable of outputting information. In the processing responding device, the first protocol processing unit may make the first outputting unit output the response to the processing request to the processing requesting device when the execution result of the second protocol processing unit meets a predetermined processing execution condition stored in the processing request. At this time, the first protocol processing unit may make the first output unit not to output the response to the processing request when the execution result of the second protocol processing unit does not meet the processing execution condition.

In the processing responding device of the invention, the first protocol may be a protocol that is capable of outputting a processing request to a plurality of processing responding devices and the second protocol may be a protocol capable of outputting a processing request to one processing responding device. Here, "capable of outputting to the plurality of processing responding devices" means that the protocol may be that of multicast and broadcast. Further more, "capable of outputting to one processing responding device" means that that the protocol may be that of unicast. At this time, the first protocol may be that of a lower order layer and the second protocol may be that of an upper order layer more than the first protocol.

In the processing responding device of the invention, the first protocol may be a SLP, the second protocol may be a SNMP and the processing request may be a processing request of the processing responding device. At this time, the first protocol processing unit may obtain the second protocol command from a tag list stored in a processing request of the first protocol.

According to a second aspect of the invention, a processing requesting device that requests a predetermined process to a processing responding device through a network includes a second output unit capable of outputting information; a request preparing unit for preparing a processing request by storing a command of a second protocol and a processing execution condition defined so as to process a response to the processing request by a first protocol on a basis of an execution result obtained when the processing responding device executes the command into the processing request of the first protocol; and a processing control unit for making the second output unit output the prepared processing request to the processing responding device.

The processing requesting device prepares the processing request by storing the command of the second protocol and the processing execution condition into the processing request of the first protocol. The processing execution condition is defined so as to process the response to the processing request by the first protocol on the basis of the execution result obtained when the processing responding device executes the command. Then, the processing requesting device outputs the processing request thus created to the processing responding device. Because the processing responding device receiving the processing request executes the command of the second protocol and processes the response to the processing request of the first protocol corresponding to the execution result, it is not necessary to separately output the request process of the first protocol and the processing request of the second protocol through the network and the execution result of the command of the second protocol may be reflected to the process of the first protocol. Accordingly, it is possible to more efficiently process the requests and to reduce the burden to the network more.

In the processing requesting device of the invention, the first protocol may be a SLP and the processing request may be a retrieve request to the processing responding device; and the request preparing unit may prepare the processing request by storing a tag list containing the command of the second protocol and the processing execution condition into the processing request. The processing requesting device further may include a second obtaining unit capable of obtaining information; and an informing unit capable of informing a user of information. In the processing requesting device, the processing control unit may make the informing unit inform the user of a response when the second obtaining unit obtains the response to the processing request outputted by the second output unit. At this time, the informing unit may be either at least one of a display unit for informing the user of the response by displaying an image, a voice output unit for informing the user of the response by outputting voice and a printing unit for informing the user of the response by printing and outputting an image on a printing medium. In the processing requesting device, the first protocol may be a protocol that is capable of outputting a processing request to a plurality of processing responding devices and the second protocol may be a protocol capable of outputting a processing request to one processing responding device.

According to a third aspect of the invention, a processing responding method executed by a computer of a processing responding device responding to a processing requesting device through a network includes steps of:
(a) obtaining a command of a second protocol when the command of the second protocol is stored in a processing request of a first protocol obtained from the processing requesting device;
(b) interpreting and executing the command of the second protocol obtained in the step (a); and
(c) processing a response to the processing request on the basis of an execution result of the step (b).

According to this processing responding method, when the command of the second protocol is stored in the processing request of the first protocol obtained from the processing requesting device, the command of the second protocol is obtained, interpreted and executed and the response to the processing request of the first protocol is processed on the basis of the execution result. Thus, the command of the second protocol is executed after receiving the processing request of the first protocol and the response to the processing request of the first protocol is processed corresponding to the execution result, so that it is not necessary to obtain the request process of the first protocol and the processing request of the second protocol separately through the network and it is possible to reflect the execution result of the command of the second protocol to the process of the first protocol. Accordingly, it is possible to efficiently process the requests and to reduce the burden of the network more. It is noted that it is possible to adopt the various modes of the processing responding device described above or to add the steps realizing the respective functions of the processing responding device described above in this processing requesting method.

According to a fourth aspect of the invention, a processing requesting method executed by a computer of a processing requesting device requesting a predetermined processing to a processing responding device through a network includes steps of:
(d) preparing the processing request by storing a command of a second protocol and a processing execution condition defined so as to process a response to the processing request by a first protocol on the basis of an execution result obtained when the processing responding device executes the command into the processing request of the first protocol; and
(e) outputting the processing request prepared in the step (d) to the processing responding device.

According to this processing requesting method, the processing request is prepared by storing the command of the second protocol and the processing execution condition into the processing request of the first protocol. The processing execution condition is defined so as to process the response to the processing request by the first protocol on the basis of the execution result obtained when the processing responding device executes the command. Then, the processing requesting device outputs the processing request thus created to the processing responding device. Because the processing responding device receiving the processing request executes the command of the second protocol and processes the response to the processing request of the first protocol corresponding to the execution result, it is not necessary to separately output the request process of the first protocol and the processing request of the second protocol through the network and the execution result of the command of the second protocol may be reflected to the process of the first protocol. Accordingly, it is possible to more efficiently process the requests and to reduce the burden to the network more. It is noted that it is possible to adopt the various modes of the processing requesting device described above or to add the steps realizing the respective functions of the processing requesting device described above in the processing requesting method.

The program of the invention realizes the respective steps of the processing responding method or the processing requesting method described above in one or in a plurality of computers. This program may be recorded in a computer readable recording medium (such as a hard disk, ROM, FD, CD, DVD and others), may be distributed from one computer to other computers through a transmitting medium (communication network such as Internet and LAN) and may be passed in any other form. It is possible to execute the respective steps and to obtain the same operations and effects with the processing responding method or the processing requesting method described above by executing this program by one computer or by the plurality of computers while shearing the respective steps.

BRIEF DESCRIPTION OF THE DRAWINGS

FIG. 4 is a conceptual diagram of a service retrieve request during normal time;

FIG. 5 is a conceptual diagram of a service retrieve request containing an execution command of SNMP.

DESCRIPTION OF THE PREFERRED EMBODIMENT

Figure 1:
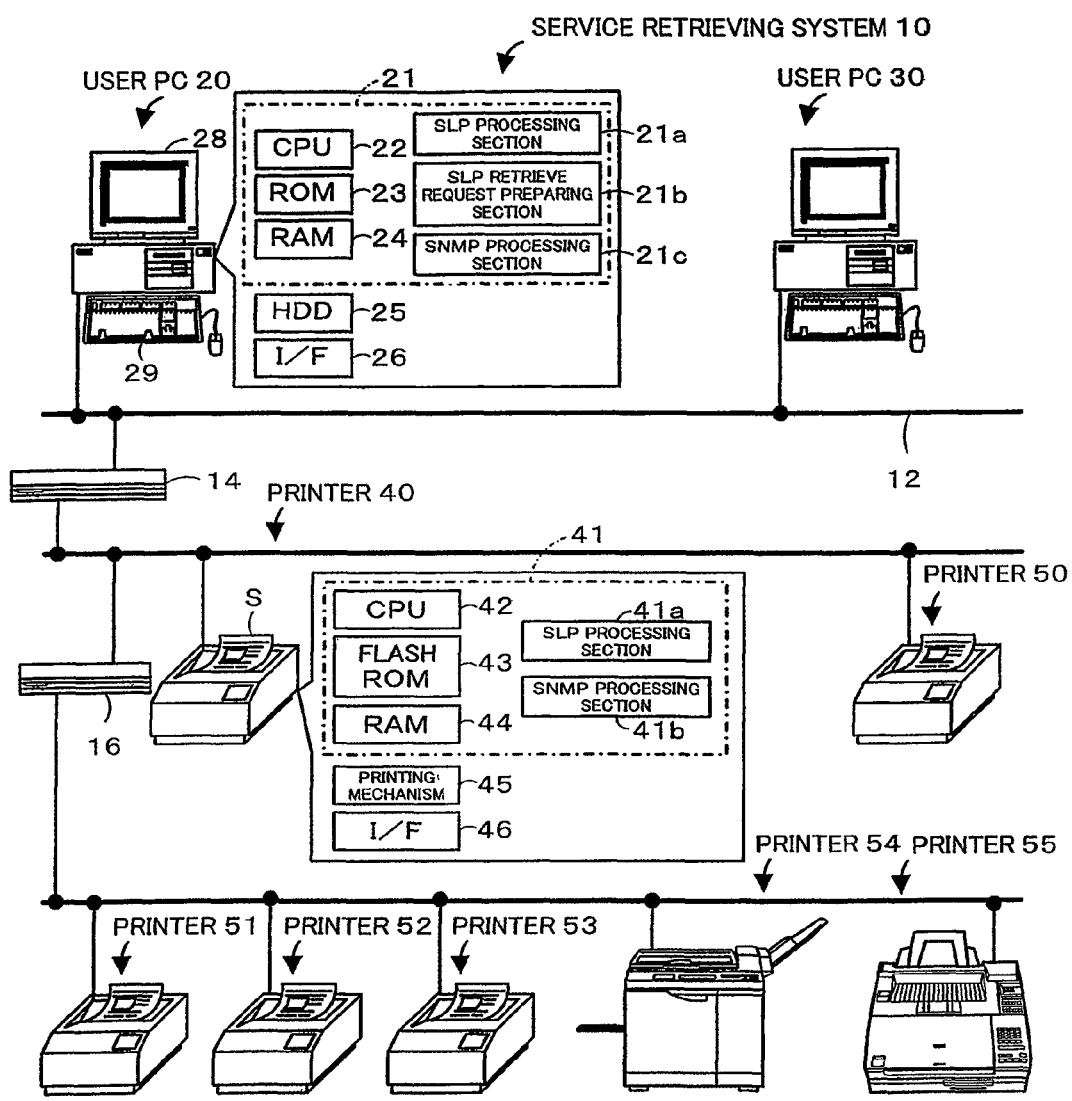
FIG. 1 shows a schematic structure of a service retrieving system 10 of the invention.

Next, one embodiment that embodies the invention will be explained. FIG. 1 shows a schematic structure of a service retrieving system 10 that is one embodiment of the invention. The service retrieving system 10 of the present embodiment is composed of user PCs 20 and 30 connected to a LAN 12 as a network and having a function of a processing requesting device of the invention, a plurality of printers 40, 50, 51, . . . having a function as a processing responding device and routers 14 and 16 connected to the LAN 12 to route the user PC 20 and the printer 40. It is noted that although the service retrieving system 10 is composed of seven printers and two user PCs, it may have any arbitrary numbers of printers and PCs.

The user PC 20 is a known general-purpose personal computer and has a controller 21 including a CPU 22 for executing various controls, a ROM 23 for storing various control programs and a RAM 24 for temporarily storing data, a HDD 25, i.e., a large volume memory for storing various application programs and various data files and an I/F 26 capable of transmitting/receiving signals between external devices connected to the LAN 12. The controller 21 also has a SLP processing section 21a that functions as an user agent of SLP (Service Location Protocol), a SLP retrieve request preparing section 21b that creates a request for retrieving a service of a printer and others connected to the LAN 12 by utilizing the SLP and others and a SNMP processing section 21c that functions as a manager of SNMP (Simple Network Management Protocol). Here, the SLP is set to be operable in multicast, broadcast and unicast and the SNMP to be operable in unicast. The user PC 20 transmits a file print command to the printer 40 and receives information transmitted from the printer 40 via the LAN 12 by an installed program. The user PC 20 transmits/receives data to/from the printer 40 and others via the LAN 12 by utilizing a receiving buffer and a transmitting buffer provided in a predetermined area of the RAM 24 as information storage unit. The user PC 20 is provided with a display 28 for displaying various information on a screen and an input device 29 such as a keyboard by which a user inputs various commands and has functions of executing operations corresponding to input manipulations when the user inputs and manipulates a cursor and others displayed on the display 28 through the input device 29. It is noted that the printer 30 has the same structure with the user PC 20, so that its explanation will be omitted here.

The printer 40 includes a controller 41 having a CPU 42 for controlling the whole device, a readable/writable flash ROM 43 storing various processing programs and a RAM 44 for temporarily storing data, a printing mechanism 45 for printing on a recording sheet S by using toners as coloring agents and an I/F 46 capable of transmitting/receiving signals with external devices connected to the LAN 12. The printer 40 transmits/receives data to/from the user PC 20 and others by utilizing a receiving buffer and a receiving buffer provided in a predetermined area of the RAM 44. The controller 41 is also provided with a SLP processing section 41a for processing a retrieve request of the SLP to function as a service agent of the SLP and with a SNMP processing section 41b for executing a command of the SNMP to function as an SNMP agent. Although not shown, various intrinsic information such as an IP address and a MAC address beside a domain name of the printer 40, types of service accommodated by the printer 40, a manufacturer name that is information on the maker of the printer 40 and a product name are stored in the flash ROM 43. MIB (Management Information Base) defining items managed by the SNMP for holding states of the printer 40 is stored in the flash ROM 43. Information on functions of the printer 40 (such as if it can perform double-face printing), information on toners and others are stored in the MIB. The printing mechanism 45 is constructed as a full-color electrographic printing mechanism adopting a single photoreceptor type and an intermediate transfer type and has a mechanism of forming electrostatic latent images of respective colors separated into cyan (C), magenta (M), yellow (Y) and black (K) on a photoreceptor, developing the electrostatic latent images by toners of the respective colors, of transferring the toner images finally to a recording sheet S and fixing the transferred recording sheet S. It is noted that the printing mechanism 45 may be an ink-jet type that pressurizes inks within ink cartridges by piezoelectric elements or heaters provided within a printer head to discharge to the recording sheet S. It is noted that the printers 50 through 55 have the same structure with the printer 40, so that their explanation will be omitted here.

Figure 2:
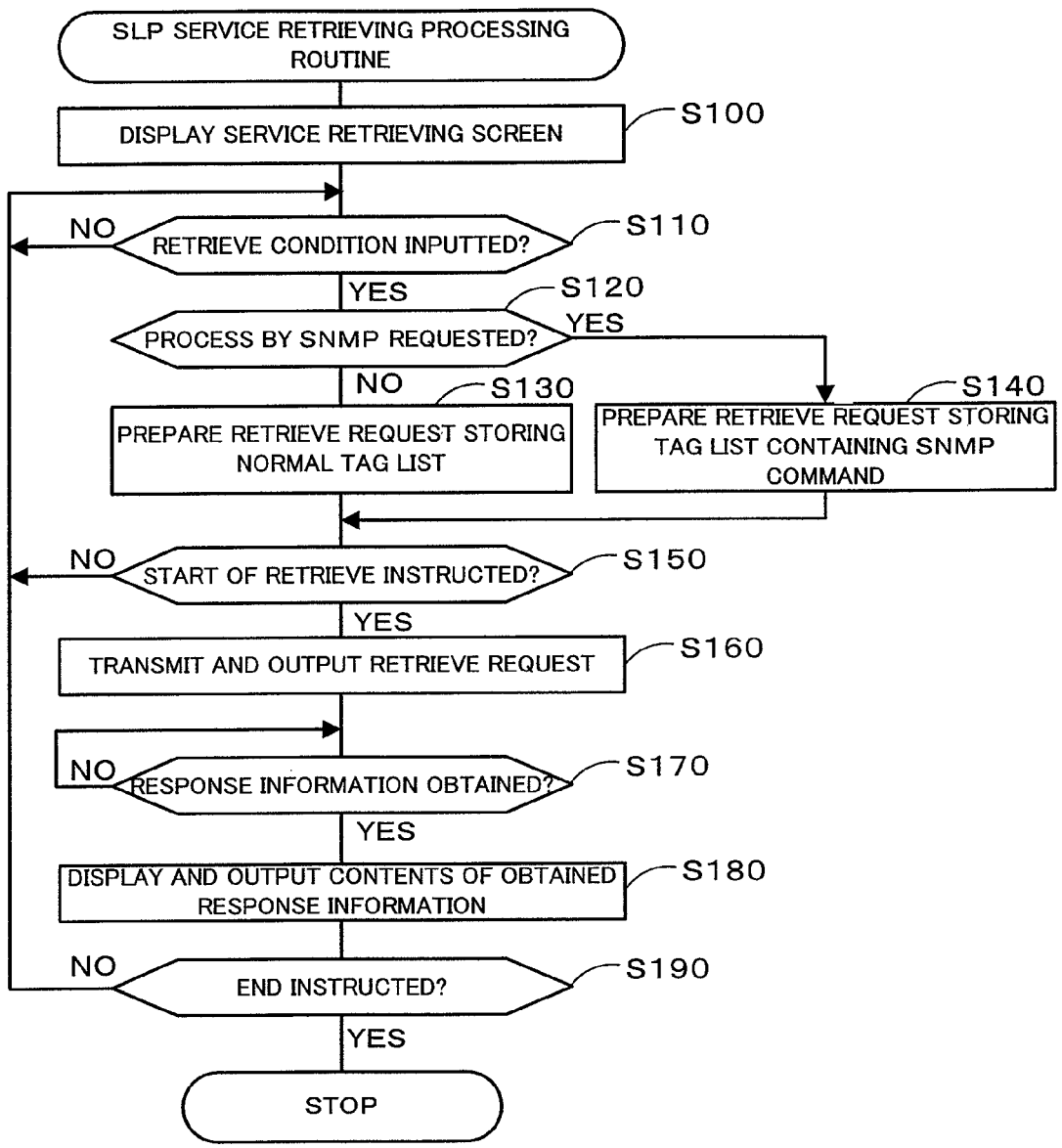
FIG. 2 is a flowchart showing one exemplary service retrieving processing routine.

Next, operations of the service retrieving system 10 of the present embodiment constructed as described will be explained by exemplifying a case of retrieving a service provided in the LAN 12 by the user PC 20 by utilizing the SLP. Here, a case of retrieving a predetermined domain name among the devices connected to the LAN 12 by mainly using the user PC 20 and the printer 40 will be explained for convenience of explanation. At first, the user manipulates the input device 29 of the user PC 20 to execute a service retrieving program for utilizing the SLP stored in the HDD 25. Then, the CPU 22 of the user PC 20 executes a SLP service retrieval processing routine stored in the HDD 25 and shown in FIG. 2. FIG. 2 is a flowchart showing one exemplary SLP service retrieval processing routine executed by the user PC 20. When this routine starts, the CPU 22 reads a service retrieving screen 80 stored in the HDD 25 and displays on the display 28 (Step S100).

Figure 3:
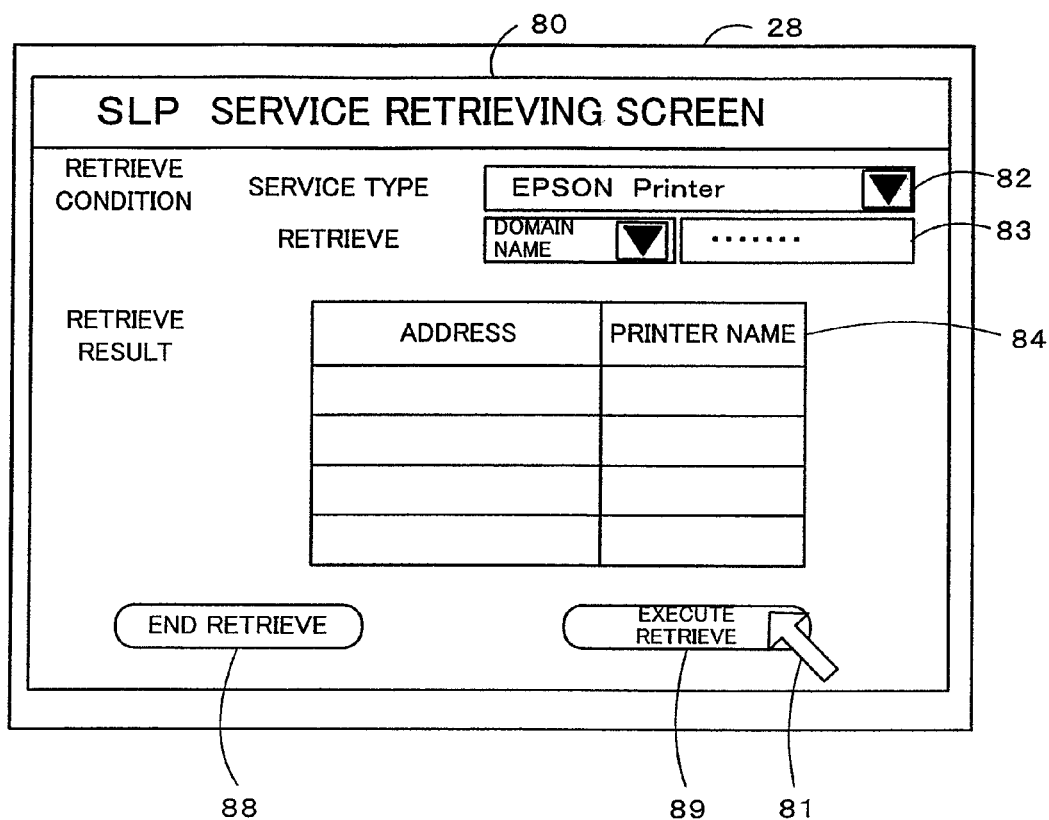
FIG. 3 is a drawing for explaining a service retrieving screen 80.

FIG. 3 is a drawing for explaining a service retrieving screen 80. The service retrieving screen 80 is provided with a cursor 81 that moves on the screen on the basis of manipulation of the user, a service type input section 82 into which the user inputs a name of a maker and a type of a service to be retrieved by a pull-down menu and others not shown, a retrieving string input section 83 that enables the user to select a type of intrinsic information of a retrieve item such as the domain name by pull-down and enables the user to input a string of the type, a retrieve result display section 84 into which retrieval results of services of the devices connected to the LAN 12 on the basis of retrieval conditions, a retrieve end button 88 clicked when the retrieval ends, a retrieve execute button 89 clicked when the retrieval is executed and others. The user inputs contents to be retrieved into the service type input section 82 and the retrieving string input section 83.

Next, the CPU 22 judges whether or not the retrieve conditions have been inputted on the basis of judgment whether the contents have been inputted into the service type input section 82 and the retrieving string input section 83 (Step S110). When no retrieve condition has been inputted, it stands by for a while and when the retrieve conditions have been inputted, the CPU 22 judges whether or not a retrieve condition requiring execution and processing of a command of the SNMP in retrieving by the SLP have been inputted (Step S120). Here, the retrieve condition requiring the execution and processing of the command of the SNMP is a retrieve condition that requires a judgment whether or not information contained in the MIB obtained from the printer 40 matches with the inputted condition. When no condition requiring the execution and processing the command of the SNMP is contained in the retrieve condition, a retrieve condition storing a normal SLP tag list is prepared (Step S130). Here, the SLP processing section 21*a* creates the retrieve request.

FIG. 4 is a conceptual diagram of a service retrieve request during normal time. Here, a case of retrieving a product name of EPSON printer connected to the LAN 12 will be explained as a concrete example. When the user inputs "EPSON printer" into the service type input section 82 and "Product name" to the retrieving string input section 83 in the service retrieving screen 80, the SLP processing section 21*a* creates the retrieve request storing "p-dev.1248 (indicates EPSON) that indicates a maker of the device and "printer" that indicates a type of service to be retrieved and storing the tag list containing intrinsic information of the object to be retrieved such as "x-1248-p-dev." indicating an extended function of the vendor and "pn" indicating the product name.

When the condition requiring the execution and processing of the SNMP command is contained in the retrieve condition, the CPU 22 supposes that the execution of the SNMP command is required in the printer 40 and creates a retrieve request of the SLP storing the tag list containing the SNMP execution command (Step S140). Here, the SLP retrieve request preparing section 21*b* creates the retrieve condition. FIG. 5 is a conceptual diagram of a service retrieve request containing the execution command of the SNMP. When "EPSON printer" is inputted into the service type input section 82 and "Product name" is inputted to the retrieving string input section 83 of the service retrieving screen 80, the SLP processing section 21*a* creates the retrieve request storing "p-dev.1248 (indicates EPSON) that indicates the maker of the device and "printer" that indicates a type of service to be retrieved and storing the tag list containing "x-1248." indicating the extended function of the vendor and "p-spt" i.e., an attribute, for processing the SNMP defined in the extended function, "snmpget" indicating to internally process Get Request-PDU of the SNMP, "V1" indicating that the snmpget is carried out in the SNMP v1, " public" that is a name of a community, "1.

3. 6. 1. 2. 1. 1. 5. 0" (represents sysName) as an object ID of the MIB, "result: noError" as a processing execution condition defined so as to execute a response to this retrieve request when the execution result of the command matches and others. That is, the contents of the tag list is defined so as to return the response to the retrieve request when the result of execution of the SNMP command is "noError". It is arranged so that a judgment whether or not the SNMP execution command in the printer 40 is stored in the tag list is readily made by using characters such as "{ }" to its head and end and "|" for delimiting the contents, other than those specified for description of the tag list of the SLP. It is noted that although the command and others of the SNMP have been explained as a character such as "noError" for convenience of the explanation here, the contents of the tag list is actually described by hexa of the SNMP like "020100" (indicating noError).

Next, the CPU 22 judges whether or not start of retrieve is instructed on the basis of whether or not the retrieve execute button 89 is clicked (Step S150) and executes the processes on and after Step S110 when no instruction of start of retrieve is given. When the instruction of start of retrieve is given on the other hand, the I/F 26 transmits and outputs the retrieve request prepared in Step S130 or 140 to the printer connected to the LAN 12 (Step S160). Here, while it is possible to designate either the devices within the router 14, the devices within the router 16 or the whole devices by the SLP in transmitting and outputting the retrieve request, the retrieve request is transmitted and outputted to the whole devices of the LAN 12 here in the multicast. After Step S 160, the CPU 22 judges whether or not the I/F 26 has obtained response information from the respective printers (Step S170). When the I/F 26 has obtained no response information, the CPU 22 stands by as it is and the I/F 26 has obtained the response information, the CPU 22 displays and outputs contents of information corresponding to the retrieve conditions on the display 28 (Step S180). Here, the CPU 22 displays and outputs the service retrieving screen 80 in which the retrieved contents are embedded to the retrieve result display section 84. Then, the CPU 22 judges whether or not the retrieving process has been finished on the basis of whether or not the retrieve end button 88 has been clicked (Step S190). The CPU 22 executes the processes on and after Step S110 when the retrieving process has not been finished or closes the service retrieving screen 80 and ends this routine when the retrieving process has been finished. When the condition requiring the execution and processing of the SNMP command is contained in the retrieving string input section 83 as described above, the retrieve request storing the SNMP command in the tag list on the basis of the rule set in advance is prepared and is transmitted to the printer to be retrieved.

Figure 6:
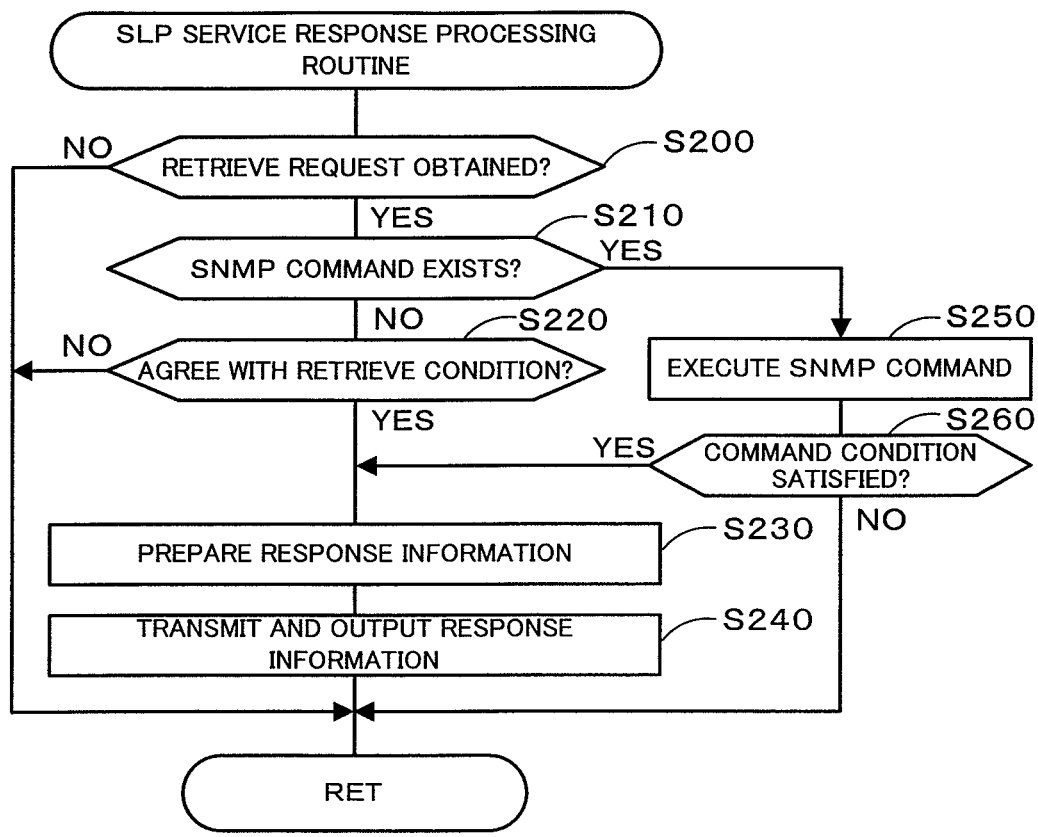
FIG. 6 is a flowchart showing one exemplary service response processing routine.

Next, an operation of the printer 40 responding to the retrieve request transmitted by the user PC 20 will be explained. FIG. 6 is a flowchart showing one exemplary service response processing routine executed by the printer 40. This routine is stored in the flash ROM 43 and is repeatedly executed per predetermined timing, e.g., per several msec., after when the printer 40 is turned ON. When this routine is started, the CPU 42 judges at first whether or not the I/F 46 has received the retrieve request (Step S200) and ends this routine as it is when the I/F 46 has obtained no retrieve request. When the I/F 46 has obtained the retrieve request on the other hand, the CPU 42 judges whether or not the SNMP command is contained in the retrieve request (Step S210). The judgment whether or not the SNMP command is contained may be carried out on the basis of whether or not the characters other than those specified for the description of the tag list are contained in the tag list or on the basis of whether or not "p-spt" is contained in the tag list. The CPU 42 assumes that it is a normal retrieve when no SNMP command is contained and judges whether or not the retrieve conditions designated in the tag list coincide with the information stored in the flash ROM 43 and others, i.e., whether or not the retrieve conditions are met (Step S220). Here, the judgment whether or not the retrieve conditions are met is carried out on the basis of whether types of services stored in the flash ROM 43 coincide with the type of service contained in the retrieve request or whether the contents stored in the flash ROM 43 coincide with the contents described in the tag list. When it is judged that the retrieve condition is not met, the CPU 42 ends this routine as it is without creating response information. When it is judged that the retrieve condition is met on the other hand, the CPU 42 creates response information storing an attribute list corresponding to the contents of the retrieve (Step S230). Then the I/F 46 transmits and outputs the created response information to the user PC 20 that transmitted the retrieve request by utilizing the unicast of the SLP (Step S240), thus ending this routine.

When a SNMP command is contained in Step S210 on the other hand, the CPU 42 obtains the SNMP command from the tag list stored in the retrieve request and executes this command (Step S250). Here, the SLP processing section 41*a* reads the tag list to obtain the SNMP command and to pass to the SNMP processing section 41*b* and the SNMP processing section 41*b* receiving it executes the SNMP command. Next, the CPU 42 judges whether or not the command execution result meets the process executing condition described in the tag list (Step S260). Here, the SNMP processing section 41*b* passes the command execution result to the SLP processing section 41*a* and the SLP processing section 41*a* receiving it judges whether or not it meets the processing execution condition described in the tag list. Here, this will be explained by exemplifying the case shown in FIG. 5. It is judged whether or not the processing execution condition is met on the basis of whether or not the SNMP command execution result is "noError". When the command execution result does not meet the processing execution condition described in the tag list, the CPU 42 ends this routine as it is without creating any response to the retrieve request, i.e., without outputting any response. When the command execution result meets the processing execution condition described in the tag list on the other hand, the CPU 42 creates response information storing an attribute list corresponding to the contents of retrieve (Step S230). Then, the I/F 46 transmits and outputs the created response information to the user PC 20 that transmitted the retrieve request by utilizing the unicast of the SLP (Step S240), thus ending this routine.

Here, consider a case of retrieving a specific printer among those connected to the LAN 12 by narrowing down the retrieve conditions by a function of printer (such as double-face printing function) for example. In such a case, it is possible to obtain information related to the function of each printer by utilizing the SNMP because the information about the function of the printer is stored in the MIB of each printer. Still more, because it is possible to retrieve the printer among the devices connected to the LAN 12 as a service, it is possible to retrieve the printer by utilizing the SLP. However, it takes time and a load posed on the network becomes large if the retrieval is made under such retrieve conditions by separately utilizing the SLP and the SNMP because the information of each individual printer must be obtained by the SNMP in the unicast after retrieving the printers by the SLP in the multicast or broadcast. Furthermore, considering a fact that new devices are connected one after another to the LAN 12, there is a problem that setting of the devices must be sequentially carried out because there exist the devices that have been connected to the LAN 12 and that do not correspond to newly added attributes even though it is conceivable to newly add information of a newly generated object (e.g., a double-face printing function is added) to the service attribute of the SLP by arranging the method for constructing the service retrieving system 10. It is also difficult to extend the function of the attribute of the SLP in synchronism with MIB of the SNMP of the new device, connected to the LAN 12, whose function is extended. In regard with this, the service retrieving system 10 of the present embodiment is arranged so that the user PC 20 stores the SNMP command and the processing execution condition in the retrieve request of the SLP and transmits and outputs it to the plurality of printers by utilizing the SLP and the respective printers receiving the retrieve request execute the SNMP command and only those whose execution result meet the processing execution condition (e.g., those meeting the condition that it has the double-face printing function) return the response information to the user PC 20 by utilizing the SLP.

Here, the correspondence between the components of the embodiment and those of the invention will be clarified. The printer 40 of the embodiment corresponds to the processing responding device of the invention. Among them, the I/F 46 corresponds to the first obtaining unit and the first output unit, the controller 41 (the SLP processing section 41*a*) corresponds to the first protocol processing unit and the controller 41 (the SNMP processing section 41*b*) corresponds to the second protocol processing unit. Furthermore, the user PC 20 corresponds to the processing requesting device. Among them, the I/F 26 corresponds to the second output unit and the second obtaining unit, the controller 21 (the SLP retrieve request preparing section 21*b*) corresponds to the request creating unit, the CPU 22 corresponds to the processing control unit, the SLP corresponds to the first protocol and SNMP corresponds to the second protocol. According to the embodiments of the present invention, the service retrieving system 10 is described to exemplify the process responding method and the processing requesting method of the invention.

According to the service retrieving system 10 of the embodiment detailed above, the user PC 20 creates the retrieve request by storing the SNMP command and the processing execution condition defined so as to process a response to the retrieve request by the SLP on the basis of execution result obtained when the printer 40 executes this command in the retrieve request of the SLP and output the created retrieve request to the printer 40. Then, when the SNMP command is stored in the retrieve request of the SLP obtained from the user PC 20, the printer 40 obtains the SNMP command and interprets and executes the obtained SNMP command and makes a response to the retrieve request when the execution result meets the processing execution condition. It is not thus necessary to transmit or to obtain the request process of the SLP and the retrieve request of the SNMP separately through the network because the service retrieving system 10 executes the SNMP command by receiving the retrieve request of the SLP and processes the response to the retrieve request of the SLP corresponding to the execution result. Therefore, the service retrieving system 10 can reflect the SNMP command execution result to the process of the SLP. Accordingly, it is possible to retrieve more efficiently and to reduce the load of the network. Still more, the user PC 20 can utilize the response to the retrieve request because the retrieve result is transmitted to the user PC 20. Still more, because no response to the retrieve request is transmitted when the execution result does not meet the processing execution condition, it is possible to reduce the load of the network further. Because the SLP is a protocol capable of outputting the retrieve request to the plurality of printers and the SNMP is a protocol capable of outputting the retrieve request to one printer, it is not necessary to output the retrieve request to the individual device after outputting the retrieve request by the SLP, thus reducing the load of the network further. Thus, the retrieving process by the SLP to the plurality of devices and the execution of the information obtaining process by the SNMP per each device may be carried out at once. Furthermore, because the SNMP command is obtained from the tag list stored in the retrieve request of the SLP, the SNMP command may be obtained relatively easily. Then, because the result of the response to the retrieve request is displayed on the display 28, the user can easily utilize the response to the retrieve request.

It is noted that the invention is not limited at all to the embodiments described above and that it is needless to say that the invention may be carried out in various modes as long as they belong to the technological range of the invention.

For example, although the SNMP command has been stored in the retrieve request of the SLP and has been executed in the printer to be obtained in the embodiment described above, the invention is not specifically limited to those protocols and the retrieve requests and is applicable to any one as long as it is arranged such that a command of a second protocol is stored in a processing request of a first protocol and a response to the processing request of the first protocol by an execution result of the command of the second protocol.

Although it is possible to arrange so that the first and second protocols can output to one device or the first and second protocols can output to a plurality of devices, it is preferable in view of exchanges of communication to arrange such that the first protocol can output to a plurality of devices and the second protocol can output to one device. It is noted that the first and second protocols may be the same hierarchy or may be separate hierarchies.

While the response to the retrieve request has been transmitted when the execution result of the SNMP command stored in the retrieve request of the SLP was noError in the embodiment described above, the invention is not limited to that and may be arranged so that a response to a retrieve request is transmitted when a predetermined processing execution condition is met. Further, although the SNMP command is stored in the tag list, it may be stored in another part beside the tag list.

Although the tag list has been created by using the characters not specified for the description of the tag list, such as "{ }, |" in the embodiment described above, it is also possible to adopt other non-specified characters. Still more, although the characters not specified for the description of the tag list have been used for the head and last characters and for the character delimiting the contents of the tag list, these characters may be used for other parts of the tag list. Or, although the tag list has been created by utilizing the characters not specified for the description of the tag list, the tag list may be created without using the characters not specified for the description of the tag list. In this case, it is possible to create a tag list by using characters or strings that are defined in advance so as to be readily discernible for the CPU 42 that the command is included. It is noted that the CPU 42 may be arranged so as to judge whether or not it is a narrow-down retrieval on the basis of existence of a wild card character.

Although the response information, i.e., the retrieve result, has been displayed and outputted as an image on the display 28 in the embodiment described above, it is possible to arrange so as to inform the user of the response by outputting voice from a speaker not shown or to inform the user of the response by printing the image on a recording sheet S.

While the retrieve executing device of the invention has been the user PC 20 and the retrieve responding device has been the printer 40 in the embodiment described above, the retrieve executing device may be the printer 40 and the retrieve responding device may be the user PC 20. Beside them, the invention is applicable to devices (a scanner, a router, a facsimile and others connected to the LAN 12 for example) as long as they accommodate to the service retrieval by the SLP without any specific limitation.

The present specification contains the subject matter of Japanese Patent Application No. 2007-15489 filed in Japan on Jan. 25, 2007, the entire disclosed contents of the specification, drawings, and claims of which are incorporated herein by reference.

What is claimed is:

1. A processing responding device that responds to a processing requesting device through a network, comprising:
    a first obtaining unit configured to obtain information;
    a first network protocol processing unit configured to obtain a command of a second network protocol when the command of the second network protocol is stored in a processing request of a first network protocol obtained by the first obtaining unit from the processing requesting device; and
    a second network protocol processing unit configured to interpret the obtained command of the second network protocol, to execute and pass a result of the execution to the first network protocol processing unit; wherein
    the first network protocol processing unit processes a response to the processing request on the basis of the execution result of the second network protocol processing unit; and
    wherein the first network protocol is a protocol that is configured to output a processing request to a plurality of processing responding devices by either broadcast or multi-cast and the second network protocol is a protocol configured to output a processing request to one processing responding device;
    wherein the first network protocol is a SLP, the second network protocol is a SNMP and the processing request is a processing request of the processing responding device;
    wherein the first network protocol processing unit outputs the response to the processing request to the processing requesting device when the execution result of the second network protocol processing unit meets a predetermined processing execution condition stored in the processing request, and the first network protocol processing unit does not output the response to the processing request when the execution result of the second network protocol processing unit does not meet the processing execution condition.

2. The processing responding device according to claim 1, wherein the first network protocol processing unit obtains the second network protocol command from a tag list stored in a processing request of the first network protocol.

3. A processing requesting device that requests a predetermined process to a processing responding device through a network, comprising:
    a request preparing unit configured to prepare a processing request by storing a command of a second network protocol and a processing execution condition defined so as to process a response to the processing request by a first network protocol on a basis of an execution result obtained when the processing responding device executes the command into the processing request of the first network protocol; and
    a processing control unit configured to output the prepared processing request to the processing responding device;
    wherein the first network protocol is a protocol that is configured to output a processing request to a plurality of processing responding devices by either broadcast or multi-cast and the second network protocol is a protocol configured to output a processing request to one processing responding device;
    wherein the first network protocol is a SLP, the second network protocol is a SNMP and the processing request is a processing request of the processing responding device;
    wherein the processing responding device outputs the response to the processing request to the processing requesting device when the execution result of the second network protocol processing command meets a predetermined processing execution condition stored in the processing request and the processing responding device does not output the response to the processing request when the execution result of the second network protocol processing command does not meet the processing execution condition.

4. The processing responding device according to claim 3, wherein the first network protocol is a SLP and the processing request is a retrieve request to the processing responding device; and the request preparing unit prepares the processing request by storing a tag list containing the command of the second network protocol and the processing execution condition into the processing request.

5. The processing requesting device according to claim 3, further comprising:
   a second obtaining unit configured to obtain information; and
   an informing unit configured to inform a user of information;
   wherein the processing control unit makes the informing unit inform the user of a response when the second obtaining unit obtains the response to the processing request outputted by the processing control unit.

6. The processing requesting device according to claim 5, wherein the informing unit is either at least one of a display unit for informing the user of the response by displaying an image, a voice output unit for informing the user of the response by outputting voice and a printing unit for informing the user of the response by printing and outputting an image on a printing medium.

7. A processing responding method executed by a computer of a processing responding device responding to a processing requesting device through a network, comprising steps of:
   (a) obtaining a command of a second network protocol when the command of the second network protocol is stored in a processing request of a first network protocol obtained from the processing requesting device;
   (b) interpreting and executing the command of the second network protocol obtained in the step (a); and
   (c) processing a response to the processing request on the basis of an execution result of the step (b);
   wherein the first network protocol is a protocol that is configured to output a processing request to a plurality of processing responding devices by either broadcast or multi-cast and the second network protocol is a protocol configured to output a processing request to one processing responding device;
   wherein the first network protocol is a SLP, the second network protocol is a SNMP and the processing request is a processing request of the processing responding device;
   wherein the step (c) outputs the response to the processing request to the processing requesting device when the execution result of the step (b) meets a predetermined processing execution condition stored in the processing request, and the step (c) does not output the response to the processing request when the execution result of the step (b) does not meet the processing execution condition.

8. A processing requesting method executed by a computer of a processing requesting device requesting a predetermined processing to a processing responding device through a network, comprising steps of:
   (d) preparing a processing request of the first network protocol by storing a command of a second network protocol and a processing execution condition defined so as to process a response to the processing request by a first network protocol on the basis of an execution result obtained when the processing responding device executes the command into the processing request of the first network protocol; and
   (e) outputting the processing request of the first network protocol prepared in the step (d) to the processing responding device;
   wherein the first network protocol is a protocol that is configured to output a processing request to a plurality of processing responding devices by either broadcast or multi-cast and the second network protocol is a protocol configured to output a processing request to one processing responding device;
   wherein the first network protocol is a SLP, the second network protocol is a SNMP and the processing request is a processing request of the processing responding device;
   wherein the processing responding device outputs the response to the processing request to the processing requesting device when the execution result of the second network protocol processing command meets a predetermined processing execution condition stored in the processing request, and the processing responding device does not output the response to the processing request when the execution result of the second network protocol processing command does not meet the processing execution condition.

* * * * *